(12) United States Patent
Purdy et al.

(10) Patent No.: US 11,725,288 B2
(45) Date of Patent: *Aug. 15, 2023

(54) CORROSION INHIBITION PACKAGE

(71) Applicant: Fluid Energy Group Ltd., Calgary (CA)

(72) Inventors: Clay Purdy, Medicine Hat (CA); Markus Weissenberger, Calgary (CA)

(73) Assignee: DORF KETAL CHEMICALS FZE, Fujairah (AE)

( * ) Notice: Subject to any disclaimer, the term of this patent is extended or adjusted under 35 U.S.C. 154(b) by 104 days.

This patent is subject to a terminal disclaimer.

(21) Appl. No.: 16/722,369

(22) Filed: Dec. 20, 2019

(65) Prior Publication Data
US 2020/0224097 A1 Jul. 16, 2020

(30) Foreign Application Priority Data
Dec. 20, 2018 (CA) .................. CA 3028229

(51) Int. Cl.
*C23F 11/04* (2006.01)
*C23F 11/12* (2006.01)
(52) U.S. Cl.
CPC ............ *C23F 11/122* (2013.01); *C23F 11/04* (2013.01)
(58) Field of Classification Search
CPC .......... C23F 11/04; C23F 11/08; C23F 11/10; C23F 11/12; C23F 11/122; C23F 11/124; C23F 11/14; C23F 1/141; C23F 11/143; C23F 11/144; C23F 11/145
USPC ................. 252/189, 190, 191, 192, 388, 396
See application file for complete search history.

(56) References Cited

U.S. PATENT DOCUMENTS

| | | | | |
|---|---|---|---|---|
| 5,152,916 A | * | 10/1992 | Hoffmann | .......... B01D 53/1493 252/189 |
| 5,223,175 A | * | 6/1993 | Mabire | .............. B01D 17/0202 252/189 |
| 7,216,710 B2 | | 5/2007 | Welton et al. | |
| 8,765,021 B2 | | 7/2014 | Zanetto | |
| 9,260,669 B2 | * | 2/2016 | Ramachandran | ...... C10G 29/24 |
| 9,334,182 B2 | * | 5/2016 | Janak | ......................... C02F 1/50 |
| 9,505,970 B2 | * | 11/2016 | Vaughn | .................... C09K 8/42 |
| 9,796,490 B2 | * | 10/2017 | Jiang | ........................ C09K 8/74 |

(Continued)

FOREIGN PATENT DOCUMENTS

WO     WO-2018062254 A1 *  4/2018    .............. C23F 11/12

OTHER PUBLICATIONS

Jayaperumal et al. ("Inhibition effect of ethanolamines on oil well tubular material in hydrochloric acid," Anti-Corrosion Methods and Materials, vol. 47 No. 6, 2000, pp. 349-353) (Year: 2000).*

*Primary Examiner* — Matthew R Diaz
(74) *Attorney, Agent, or Firm* — Berg Hill Greenleaf Ruscitti LLP

(57) ABSTRACT

An inhibition corrosion package for use with an acidic composition, where the package comprises a dialdehyde-containing hydrocarbon component; at least one surfactant; optionally, a propargyl alcohol or derivative thereof; and a solvent. Also disclosed are acidic compositions combining the corrosion inhibition package according to a preferred embodiment of the present invention for use in various industrial operations including but not limited to oil and gas operations. Also disclosed are methods of use of such compositions.

16 Claims, 5 Drawing Sheets

Group I: Identifiable by visual inspection

Uniform corrosion    Pitting    Crevice corrosion    Galvanic corrosion

Group II: Identifiable with special inspection tools

Erosion    Cavitation    Fretting    Intergranular

Group III: Identifiable by microscopic examination

Exfoliation    De-alloying    Stress corrosion cracking    Corrosion fatigue

(56) References Cited

U.S. PATENT DOCUMENTS

| | | | | |
|---|---|---|---|---|
| 10,059,872 B2* | 8/2018 | Janak | ............... | C23F 11/149 |
| 10,119,079 B2* | 11/2018 | Fuji | ............... | C23F 11/122 |
| 11,293,106 B2* | 4/2022 | Purdy | ............... | C09K 8/54 |
| 2001/0009682 A1* | 7/2001 | Whiteley | ............... | A01N 35/02 |
| | | | | 424/738 |
| 2003/0166472 A1 | 9/2003 | Pursley et al. | | |
| 2007/0071887 A1* | 3/2007 | Cassidy | ............... | C23F 11/04 |
| | | | | 427/97.7 |
| 2015/0126417 A1* | 5/2015 | Hatchman | ............... | C09K 8/584 |
| | | | | 507/219 |
| 2015/0322757 A1* | 11/2015 | Hatchman | ............... | E21B 43/16 |
| | | | | 166/309 |
| 2017/0198225 A1* | 7/2017 | Bailey | ............... | C10G 29/20 |
| 2017/0247798 A1* | 8/2017 | Moloney | ............... | C23F 11/04 |
| 2020/0017781 A1* | 1/2020 | Saitou | ............... | C23F 11/12 |

\* cited by examiner

J55 - B900       N80 - A745

L80 - A929       N80 - A744

L80 - A933       J55 - B883

J55 - B889        J55 - B890

N80 - A829        N80 - A827

L80 - A910        L80 - A911

N80 - A743  L80 - A934

J55 - B882  L80 - A953

L80 - A954  L80 - A952

N80 - A839　　　　　　　　J55 - C045

L80 - A962　　　　　　　　L80 - A963

CORROSION INHIBITION PACKAGE

CROSS-REFERENCES TO RELATED APPLICATION

This application claims the benefit of and priority to Canadian Application No. 3,028,229, filed Dec. 20, 2018. The entire specification and figures of the above-referenced application is hereby incorporated in its entirety by reference.

FIELD OF THE INVENTION

This invention relates to corrosion inhibition packages for use with acidic compositions, more specifically to corrosion inhibition packages for use with acidic composition wherein said package comprises a dialdehyde-containing hydrocarbon component and at least one surfactant.

BACKGROUND OF THE INVENTION

In the oil & gas industry, stimulation with an acid is performed on a well to increase or restore production. In some instances, a well initially exhibits low permeability, and stimulation is employed to commence production from the reservoir. In other instances, stimulation or remediation is used to further encourage permeability and flow from an already existing well that has become under-productive.

Acidizing is a type of stimulation treatment which is performed above or below the reservoir fracture pressure in an effort to restore or increase the natural permeability of the reservoir rock. Acidizing is achieved by pumping acid into the well to dissolve typically limestone, dolomite and calcite cement between the sediment grains of the reservoir rocks or to treat scale accumulation.

There are three major types of acid applications: matrix acidizing, fracture acidizing, and breakdown acidizing (pumped prior to a fracturing pad or cement operation in order to assist with formation breakdown (reduce fracture pressures, increased feed rates), as well as clean up left over cement in the well bore or perforations. A matrix acid treatment is performed when acid is pumped into the well and into the pores of the reservoir formation below the fracture pressure. In this form of acidization, the acids dissolve the sediments formation and/or mud solids that are inhibiting the permeability of the rock, enlarging the natural pores of the reservoir (wormholing) and stimulating flow of hydrocarbons to the wellbore. While matrix acidizing is done at a low enough pressure to keep from fracturing the reservoir rock, fracture acidizing involves pumping highly pressurized acid into the well, physically fracturing the reservoir rock and etching the permeability inhibitive sediments. This type of acid treatment forms channels or fractures through which the hydrocarbons can flow, in addition to forming a series of wormholes. In some instances, a proppant is introduced into the fluid which assists in propping open the fractures, further enhancing the flow of hydrocarbons into the wellbore.

There are many different mineral and organic acids used to perform an acid treatment on wells. The most common type of acid employed on wells to stimulate production is hydrochloric acid (HCl), which is useful in stimulating carbonate reservoirs.

Some of the major challenges faced in the oil & gas industry from using hydrochloric acid include the following: extremely high levels of corrosion (which is countered by the addition of 'filming' type corrosion inhibitors that are typically themselves toxic and harmful to humans, the environment and equipment) reactions between acids and various types of metals can vary greatly but softer metals, such as aluminum and magnesium, are very susceptible to major effects causing immediate damage. Hydrochloric acid produces Hydrogen chloride gas which is toxic (potentially fatal) and corrosive to skin, eyes and metals. At levels above 50 ppm (parts per million) it can be Immediately Dangerous to Life and Health (IDHL). At levels from 1300-2000 ppm death can occur in 2-3 minutes.

The inherent environmental effects (organic sterility, poisoning of wildlife etc.) of acids in the event of an unintended or accidental release on surface or downhole into water aquifers or other sources of water are devastating which can cause significant pH reduction of such and can substantially increase the toxicity and could potentially cause a mass culling of aquatic species and potential poisoning of humans or livestock and wildlife exposed to/or drinking the water. An unintended release at surface can also cause a hydrogen chloride gas cloud to be released, potentially endangering human and animal health. This is a common event at large storage sites when tanks split or leak. Typically, if near the public, large areas need to be evacuated post event and a comprehensive, expensive to implement, emergency evacuation plan need to be in place prior to approval of such storage areas. Because of its acidic nature, hydrogen chloride gas is also corrosive, particularly in the presence of moisture.

The inability for acids and blends of such to biodegrade naturally without neutralizing the soil results in expensive cleanup-reclamation costs for the operator should an unintended release occur. Moreover, the toxic fumes produced by mineral & some organic acids are harmful to humans/animals and are highly corrosive and/or produce potentially explosive vapours. Transportation and storage requirements for acids are restrictive and taxing in such that you must haul the products in acid approved tankers or intermediate bulk containers (IBC) that are rated to handle such corrosive products. As well, the dangers surrounding exposure by personnel handling the blending of such corrosive/dangerous products limits their use/implementation.

Another concern is the potential for exposure incidents on locations due to high corrosion levels of acids causing storage container failures and/or deployment equipment failures i.e. coiled tubing or fracturing iron failures caused by high corrosion rates (pitting, cracks, pinholes and major failures). Other concerns include: downhole equipment failures from corrosion causing the operator to have to execute a work-over and replace down hole pumps, tubing, cables, packers etc.; inconsistent strength or quality level of mineral & organic acids; potential supply issues based on industrial output levels; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a finished product locally or very near its end use; transportation and onsite storage difficulties.

Extremely high corrosion and reaction rates with temperature increase causes conventional acids to "spend/react or become neutral" prior to achieving its desired effect such as deeply penetrating an oil or gas formation to increase the wormhole or etched "pathway" effectively to allow the petroleum product to flow freely to the wellbore. As an example, hydrochloric acid can be utilized in an attempt to free stuck drill pipe in some situations. Prior to getting to the required depth to dissolve the formation that has caused the pipe/tubing to become stuck many acids spend or neutralize due to increased bottom hole temperatures and greatly increased reaction rate, so it is advantageous to have an alternative that spends or reacts more methodically allowing the slough to be treated with a solution that is still active, allowing the pipe/tubing to be pulled free.

When used to treat scaling issues on surface due to water contamination, conventional acids are exposed to human and mechanical devices as well as expensive pumping equipment causing increased risk for the operator and corrosion effects that damage equipment and create hazardous fumes. When mixed with bases or higher pH fluids, acids will create a large amount of thermal energy (exothermic reaction) causing potential safety concerns and equipment damage, acids typically need to be blended with fresh water (due to their intolerance of highly saline water, causing potential precipitation of minerals) to the desired concentration requiring companies to pre-blend off-site as opposed to blending on-site with field/produced water thereby increasing costs associated with transportation.

Conventional mineral acids used in a pH control situation can cause rapid degradation of certain polymers/additives requiring increased loadings or chemicals to be added to counter these negative effects. Many offshore areas of operations have very strict regulatory rules regarding the transportation/handling and deployment of acids causing increased liability and costs for the operator. When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel) causing the acids to become very corrosive and resulting in damage to downhole equipment/tubulars. Conventional acids are also very destructive to most elastomers found in the oil & gas industry such as those found in blow out preventers (BOP's)/downhole tools/packers/submersible pumps/seals etc. Having to deal with spent acid during the back-flush process is also very expensive as these acids typically are still at a low pH and remain toxic. It is advantageous to have an acid blend that can be exported to production facilities through pipelines that, once spent or applied, is much higher than that of spent HCl, reducing disposal costs/fees.

Acids perform many actions in the oil & gas industry and are considered necessary to achieve the desired production of various petroleum wells, maintain their respective systems and aid in certain drilling operational functions (i.e. freeing stuck pipe, filter cake treatments). The associated dangers that come with using mineral acids are expansive and tasking to mitigate through controls whether they are chemically or mechanically engineered.

The use of certain acids such as MSA results in pitting corrosion rather than uniform corrosion as is the case with HCl, for example. Pitting corrosion is a localized form of corrosion by which cavities or "holes" are produced in the material. Pitting is considered to be more dangerous than uniform corrosion damage because it is more difficult to detect, predict and design against. Corrosion products often cover the pits. A small, narrow pit with minimal overall metal loss can lead to the failure of an entire engineering system. Pitting corrosion, which, for example, is almost a common denominator of all types of localized corrosion attack, may assume different shapes. Pitting corrosion can produce pits with their mouth open (uncovered) or covered with a semi-permeable membrane of corrosion products. Pits can be either hemispherical or cup-shaped.

There are several reasons why pitting corrosion is difficult to predict or to design against. Some of these reasons include: pitting corrosion can be initiated by a localized chemical or mechanical damage to the protective oxide film. This type of damage may stem from several water chemistry factors such as acidity, low dissolved oxygen concentrations (which tend to render a protective oxide film less stable) and high concentrations of chloride (as in seawater). Pitting corrosion can also be initiated by localized damage to, or poor application of, a protective coating. A third, non-negligible, factor for the initiation of pitting corrosion resides in the presence of non-uniformities in the metal structure of the component, e.g. non-metallic inclusions.

Theoretically, a local cell that leads to the initiation of a pit can be caused by an abnormal anodic site surrounded by normal surface which acts as a cathode, or by the presence of an abnormal cathodic site surrounded by a normal surface in which a pit will have disappeared due to corrosion. In the second case, post-examination should reveal the local cathode, since it will remain impervious to the corrosion attack as in the picture of an aluminum specimen shown on the right. Most cases of pitting are believed to be caused by local cathodic sites in an otherwise normal surface. Apart from the localized loss of thickness, corrosion pits can also be harmful by acting as stress risers. Fatigue and stress corrosion cracking may initiate at the base of corrosion pits. One pit in a large system can be enough to produce the catastrophic failure of that system. An extreme example of this type of catastrophic failure happened in Guadalajara, Mexico, where a single pit in a gasoline line running over a sewer line was enough to create great havoc and kill 215 people.

The different corrosion types are set out in FIG. 1. The relevant corrosion types in acid are: uniform corrosion; pitting corrosion; and stress corrosion cracking. The most desired corrosion, when such is bound to occur, is the uniform corrosion. This type of corrosion allows one to easily calculate a mm/year corrosion and the rest thickness of a casing, pipe etc. This is the type of corrosion you see most of the time when metals are exposed to HCl.

As mentioned above, pitting corrosion is a very dangerous form of acid corrosion, as the overall mass loss (lb/ft2 or mm/year) is still low, but due to the focused corrosion at a few spots there is a creation of weak points in the metal. These weak points, caused by the pits, can lead to a catastrophic material failure. Methanesulfonic acid (MSA) at high temperatures (130° C. and higher) tends to result in pitting corrosion, much more than mineral acids such as HCl. Commercially available corrosion inhibitors cannot properly control/limit/minimize pitting done by exposure of steel to MSA. At temperatures of 150° C., those commercial corrosion inbibitors required very high concentrations of intensifier such as KI. These high concentrations of KI required do not allow these corrosion inhibitors to be used in a comprehensive manner. Moreover, higher temperatures than 150° C. cannot be employed.

U.S. Pat. No. 7,216,710 B2 teaches methods of inhibiting corrosion comprising providing a corrosive environment; adding a corrosion inhibitor comprising a reaction product of a thiol compound and an aldehyde compound. Methods of acidizing a near well bore region of a subterranean formation comprising isolating a zone of interest along a well bore; and placing an acidizing solution in the zone of interest wherein the acidizing solution comprises an acid and a corrosion inhibiting compound comprising the reaction product of a thiol compound and an aldehyde compound. The aldehyde compound referred to is cinnamaldehyde or a derivative thereof.

Eliminating or even simply reducing the negative effects of acids while maintaining their usefulness is a struggle for the industry. As the public demand for the use of cleaner/safer/greener products increases, companies are looking for alternatives that perform the required function without all or most of the drawbacks associated with the use of conventional acids.

Several operations in the oil industry expose fluids to very high temperatures (some upward of 180° C.), the compositions used in these various operations need to withstand high temperatures without losing their overall effectiveness. These compositions must also be capable of being applied in operations over a wide range of temperatures while not or at least minimally affecting or corroding the equipment with which it comes in contact in comparison to a conventional mineral acid.

Offshore oil and gas operations are highly regulated due to the environmental concerns which arise from their operations and the potential for spills. The complexity of drilling and completing offshore wells is compounded by both safety issues for workers on such offshore oil rigs and production platforms as well as environmental concerns.

Many countries bordering the waters where offshore drilling and production is routinely carried out have put into play a number of regulations aimed at minimizing the environmental impact of this practice. These regulations include the ban on certain types of chemicals which may be harmful to marine life and the environment. In order to overcome these very restrictive regulations, many oil companies employ very costly containment programs for the handling of certain chemicals such as acids which have a wide array of uses in the industry of oil and gas exploration and production.

Many of the issues related with offshore oil and gas exploration and production stem from the fact that the conditions under which this is carried out are substantially different than those encountered in the same types of operations carried out onshore.

Acidic compositions conventionally used in various oil and gas operations can reach temperatures of up to 180° C. and more. At these temperatures, their reactivity is exponentially increased and, as such, their effectiveness or even their ability to be utilized is greatly decreased. Corrosion is the major concern at high temperatures and is difficult and expensive to control with additional chemistry.

Modified and synthetic acids developed and currently patented are aimed at increasing personnel safety, reducing corrosion effects, reducing environmental damage, retarding the reaction rate and reducing the toxicity profile of HCl. However, it has been found that at temperatures above 90° C. the urea component in a synthetic or modified acid containing such compound tends to ultimately decompose to ammonia and carbon dioxide. The ammonia component will neutralize the acidic component or HCl and render the product non-reactive or neutral. Additionally, there is the risk of wellbore and/or formation damage due to uncontrolled solubilized mineral precipitation due to an increase in the pH caused mainly by the formation of ammonia during the decomposition phase. The advent of newer synthetic or modified acids is intended on providing usage at higher temperatures while still maintaining the performance, safety and environmental advantages and benefits of a urea-HCL modified or synthetic acid system. However, ultimately at these higher temperatures it is most often necessary to utilize additional or purpose developed corrosion inhibition packages and/or components to control corrosion of exposed steel. In that respect, even short exposure times at high temperature are more damaging to steel than longer exposure times at lower temperatures.

U.S. Pat. No. 8,765,021 teaches an aqueous treatment composition for inhibiting corrosion and acid attack on metallic surfaces that comprises a thiourea organic derivative, a polyalkoxylated terpene nonionic surfactant and an acid. The invention also relates to a process for cleaning industrial metallic equipment, in particular heat exchangers in which a heat transfer fluid, generally based on air or on water, flows, with a view to cleaning them and removing scale and other soiling.

US patent application no. 2003/0166472 discloses a well treatment microemulsion that is formed by combining a solvent-surfactant blend with a carrier fluid. In preferred embodiments, the solvent-surfactant blend includes a surfactant and a solvent selected from the group consisting of terpenes and alkyl or aryl esters of short chain alcohols. The disclosed well treatment microemulsion can be used in well remediation, stimulation and hydrogen sulfide mitigation operations.

Despite the various known corrosion inhibition packages, there is still a need for corrosion inhibition packages for use with mineral acid, organic acid, modified acid and synthetic acid compositions in the oil industry which can be used over a range of applications, that are specifically formulated for synthetic and modified acid systems and can be used at very high temperatures (i.e. 180° C.) without having its components degrade, phase out of solution and have a superior safety and environmental profile over known packages during use at those ultra-high temperatures. Moreover, it is desirable to have corrosion inhibition packages that do not undermine the advantages of environmentally and personnel-friendly acid compositions such as various synthetic and modified acid compositions which have fewer deleterious effects than typical conventional mineral and some organic acids.

It was unexpectedly discovered that corrosion inhibition packages according to the present invention exhibit stability when combined with acidic compositions under exposure to elevated temperature (above 150° C. and even up to at least 180° C.) and show less pitting corrosion than other high-performance corrosion inhibitors. This consequently makes them very valuable in various industries using acids at these temperatures including, but not limited to, the oil and gas industry.

SUMMARY OF THE INVENTION

According to a first aspect of the present invention, there is provided a corrosion inhibition package for use with an aqueous acid composition, said package comprising:
  a dialdehyde-containing hydrocarbon; and
  at least one surfactant.
Preferably, the corrosion inhibition package further comprises
  a propargyl alcohol or derivative thereof and
  a solvent.
Preferably, the at least one amphoteric surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from $C_8$ to $C_{16}$. Most preferably, the amido betaine comprising a hydrophobic tail from $C_8$ to $C_{16}$ is cocamidobetaine.

Preferably also, the corrosion inhibition package further comprises an anionic surfactant. Preferably, the anionic surfactant is a carboxylic surfactant or a sulfonic surfactant. More preferably, the carboxylic surfactant is a dicarboxylic surfactant. Even more preferably, the dicarboxylic surfactant comprises a hydrophobic tail ranging from $C_8$ to $C_{16}$. Most preferably, the dicarboxylic surfactant is sodium lauriminodipropionate Preferably, the surfactant is selected from the group consisting of: cocamidopropyl betaine; β-Alanine, N-(2-carboxyethyl)-N-dodecyl-, sodium salt (1:1); and a combination thereof.

Preferably, the solvent is selected from the group consisting of: methanol; ethanol; isopropanol; ethylene glycol; Di-n-hexyl-ether; and 2-Butoxyethanol; and combinations thereof.

Preferably, the dialdehyde-containing hydrocarbon is present in an amount ranging from 2% to 25% by weight of the total weight of the corrosion inhibition package. Preferably also, the propargyl alcohol or derivative thereof is present in an amount ranging from 20% to 55% by volume of the total weight of the corrosion inhibition package. Preferably also, the at least one surfactant is present in an amount ranging from 2% to 20% by volume of the total weight of the corrosion inhibition package. Preferably also, the solvent is present in an amount ranging from 10% to 45% by volume of the total weight of the corrosion inhibition package.

According to another aspect of the present invention, there is provided an acidic composition comprising:
an acid;
a corrosion package comprising:
a dialdehyde-containing hydrocarbon component;
a propargyl alcohol or derivative thereof
at least one surfactant; and
a solvent;
wherein the volume % of the corrosion package in the acidic composition ranges from 0.1 to 10%. Preferably, the acidic composition further comprises a metal iodide or iodate.

Preferably the weight/volume % of the metal iodide or iodate in the acidic composition ranges from 0.1 to 1.5%. More preferably, the wt/vol. % of the metal iodide or iodate in the acidic composition ranges from 0.25 to 1.25%. Even more preferably, the wt/vol. % of the metal iodide or iodate in the acidic composition is approximately 1%. Preferably, the metal iodide or iodate selected from the group consisting of: cuprous iodide; potassium iodide; sodium iodide; lithium iodide and combinations thereof. More preferably, the metal iodide is potassium iodide.

According to one aspect of the present invention, there is provided an acidic composition comprising a corrosion inhibition package according to the invention and an acid selected from the group consisting of: mineral acids; organic acids; alkylsulfonic acids; synthetic acids; and combinations thereof. More preferably, the acid is selected from the group consisting of: HCl; Lysine-HCl; alkanolamine-HCl such as, but not limited to MEA-HCl; Urea-HCl; hydrofluoric acid; sulfuric acid; phosphoric acid. Even more preferably, the acid is selected from the group consisting of: MEA-HCl; lysine-HCl and combinations thereof.

According to a preferred embodiment of the present invention, there is provided a corrosion inhibition package for use with an aqueous synthetic acid composition for use in onshore oil and gas operations, said composition comprising: lysine and hydrochloric acid in a molar ratio of not less than 1:12; a surfactant; a corrosion inhibitor; and an intensifier. Preferably, the lysine & hydrogen chloride are present in a molar ratio ranging from 1:5.5 to 1:12; preferably in a molar ratio ranging from 1:6 to 1:10, more preferably in a molar ratio ranging from 1:6.5 to 1:8.5.

According to an aspect of the present invention, there is provided an aqueous synthetic acid composition for use in offshore oil and gas operations, said composition comprising: lysine and hydrochloric acid in a molar ratio of not less than 1:12; a corrosion inhibitor; and an intensifier.

The use of a corrosion inhibitor package with an acidic composition where the acidic composition comprises an acid selected from the group consisting of: a mineral acid; an organic acid or a synthetic acid, said corrosion inhibitor package comprising:
a dialdehyde-containing hydrocarbon; and
at least one surfactant.

Preferably, the corrosion inhibition package further comprises: a propargyl alcohol or derivative thereof; and a solvent.

According to another aspect of the present invention, there is provided a use of a synthetic or modified acid composition comprising a preferred embodiment of the present invention in the oil and gas industry to perform an activity selected from the group consisting of: stimulating formations; assisting in reducing breakdown pressures during downhole pumping operations; treating wellbore filter cake post drilling operations; assisting in freeing stuck pipe; descaling pipelines and/or production wells; increasing injectivity of injection wells; lowering the pH of a fluid; fracturing wells; performing matrix stimulations; conducting annular and bullhead squeezes & soaks; pickling tubing, pipe and/or coiled tubing; increasing effective permeability of formations; reducing or removing wellbore damage; cleaning perforations, nozzles, ports, jets etc.; solubilizing limestone, dolomite, and calcite; and removing undesirable scale from the group consisting of: equipment, cyclical steam wells, steam flood wells, SAGD (steam assisted gravity drainage) wells, unassisted or natural high formation temperature production wells, injection wells and their related surface and down-hole equipment and facilities at high temperatures up to 220° C.

According to another aspect of the present invention, there is provided a synthetic or modified acid composition comprising a corrosion inhibition package according to a preferred embodiment for use in the oil and gas industry which has high salinity tolerance. A tolerance for high salinity fluids, or brines, is desirable for onshore and offshore acid applications. Conventional acids are normally blended with fresh water and additives, typically far offsite, and then transported to the area of treatment as a finished blend. It is advantageous to have an alternative that can be transported as a concentrate safely to the treatment area, then blended with a saline produced water or sea water. This greatly reduces logistics requirement. A conventional acid composition can precipitate salts/minerals heavily if blended with fluids of an excessive saline level resulting in formation plugging or ancillary damage, inhibiting production and substantially increasing costs. Brines are also typically present in formations, thus having an acidic composition system that has a high tolerance for brines greatly reduces the potential for formation damage or emulsions forming downhole during or after product placement/spending (reaction) occurs.

A preferred embodiment of the present invention provides a corrosion inhibition package which provides various oilfield grade steel alloys exceptional protection against corrosion when exposed to acidic compositions at low to ultra-high temperatures. Additionally, the components used in the preferred corrosion inhibition package are quite environmentally friendly.

BRIEF DESCRIPTION OF THE FIGURES

The invention may be more completely understood in consideration of the following description of various embodiments of the invention in connection with the accompanying figures, in which.

DETAILED DESCRIPTION OF THE PREFERRED EMBODIMENTS

Figure 1:
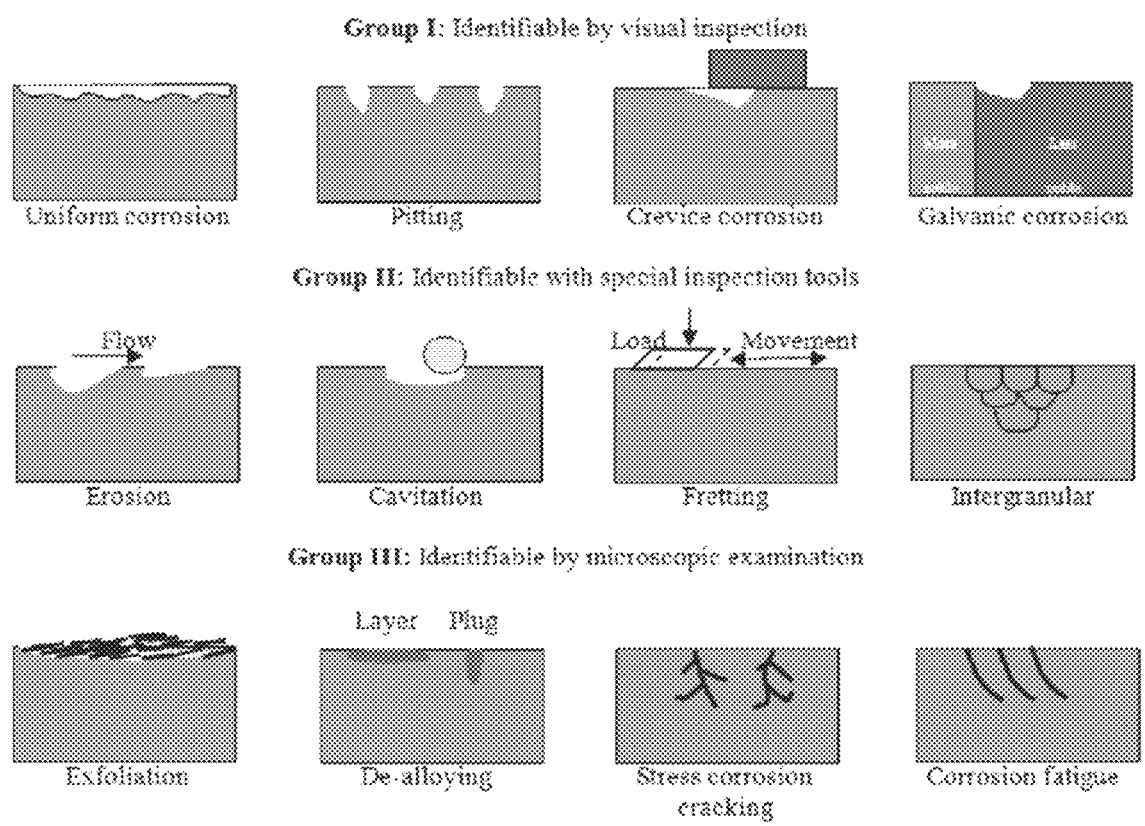
FIG. 1 is a schematic depiction of the various type of damage generated by pitting corrosion.
Figure 2:
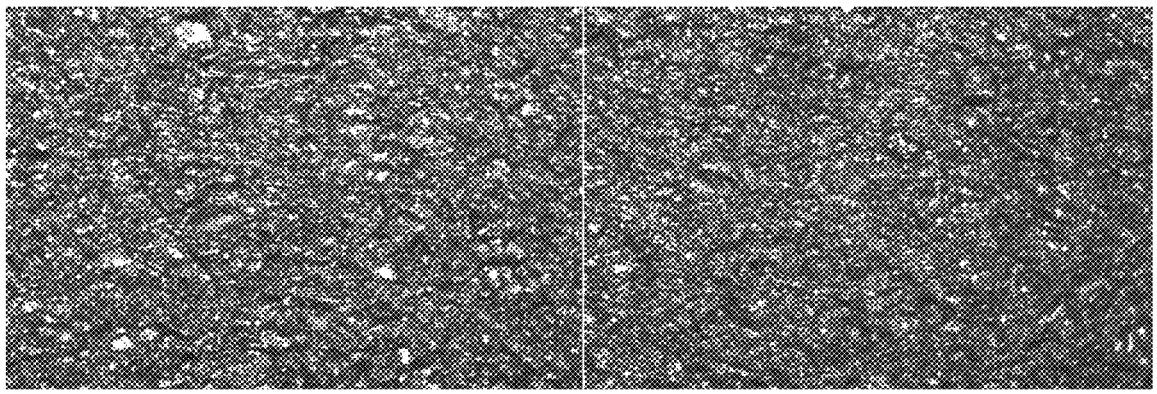
FIG. 2 contains a picture of the surface of 6 metal coupons (identified as B900, A745, A929, A744, A933, and B883) after exposure to acidic fluids as described in the description.
Figure 2:
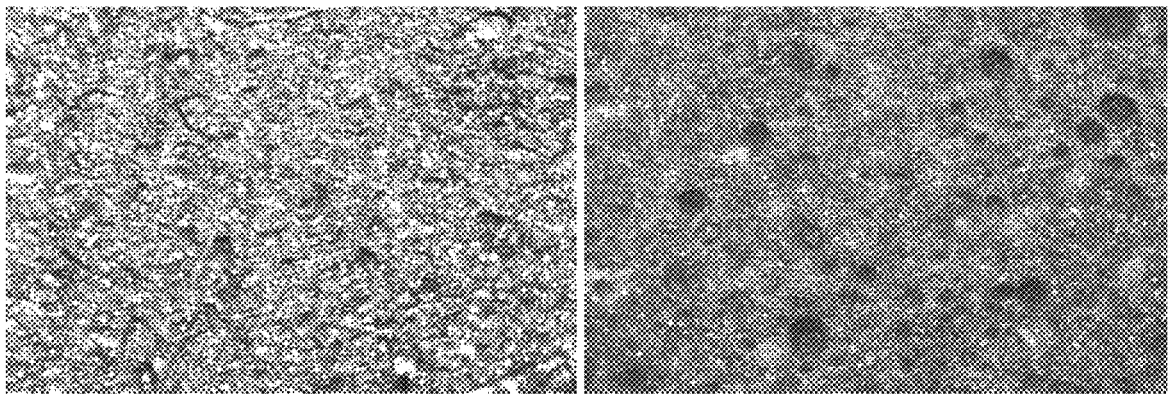
Figure 2:
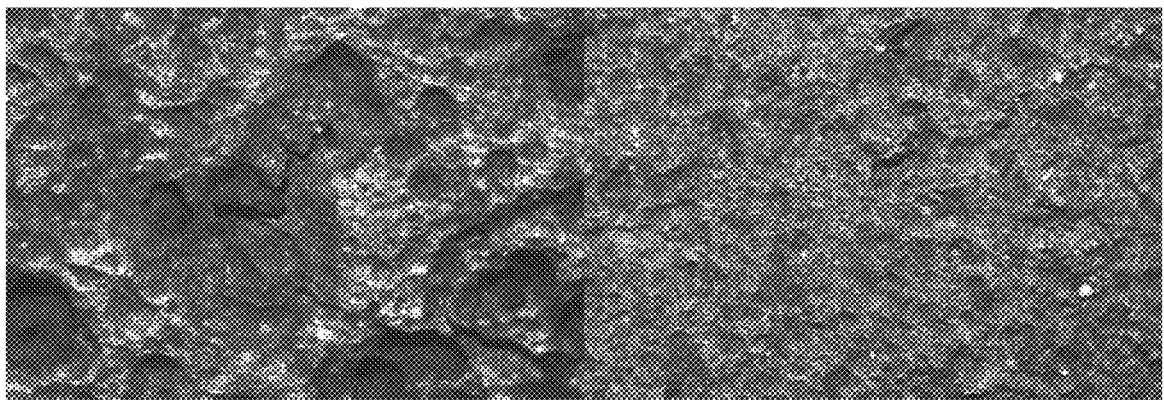
Figure 3:
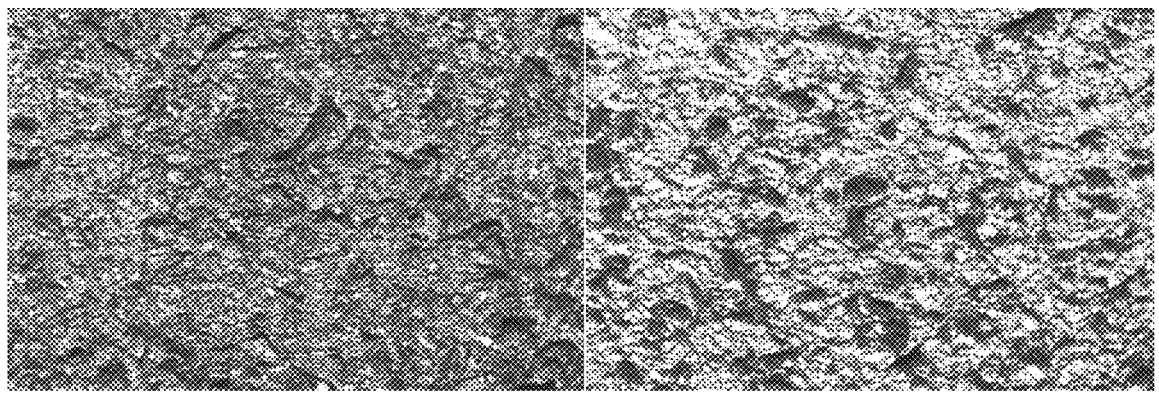
FIG. 3 contains a picture of the surface of 6 metal coupons (identified as B889, B890, A829, A827, A910, and A911) after exposure to acidic fluids as described in the description.
Figure 3:
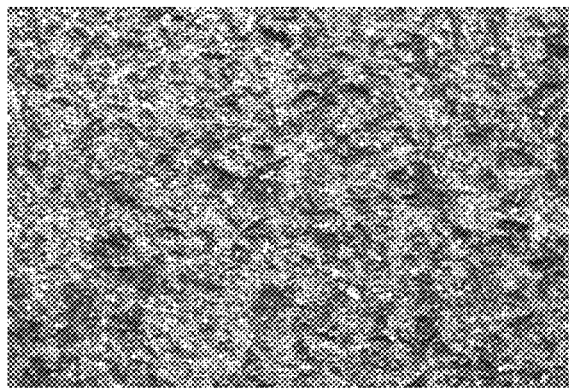
Figure 3:
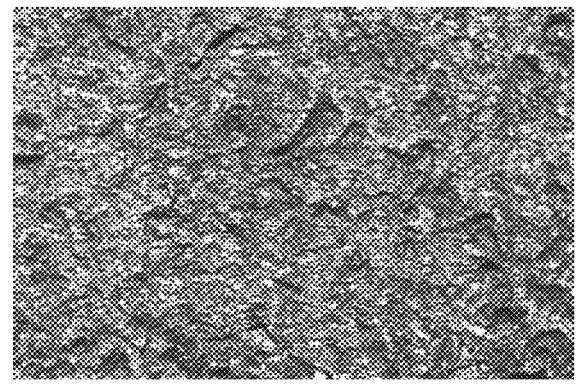
Figure 3:
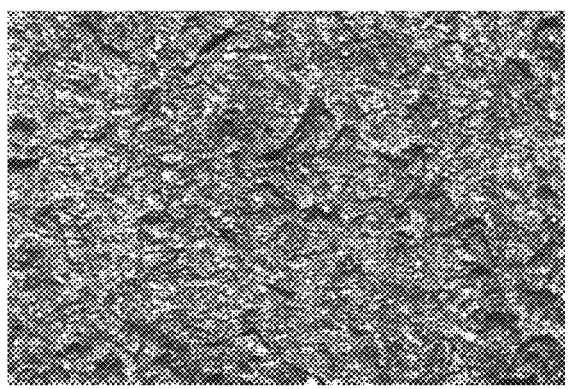
Figure 3:
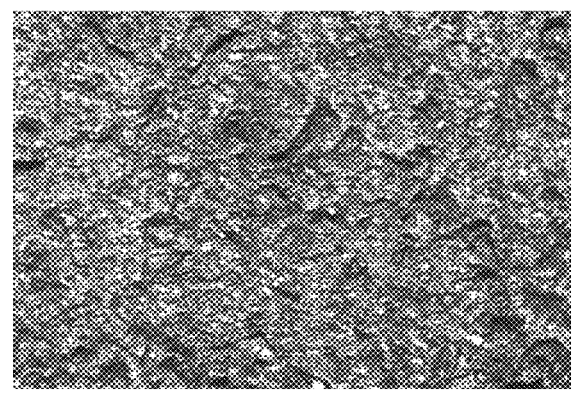
Figure 4:
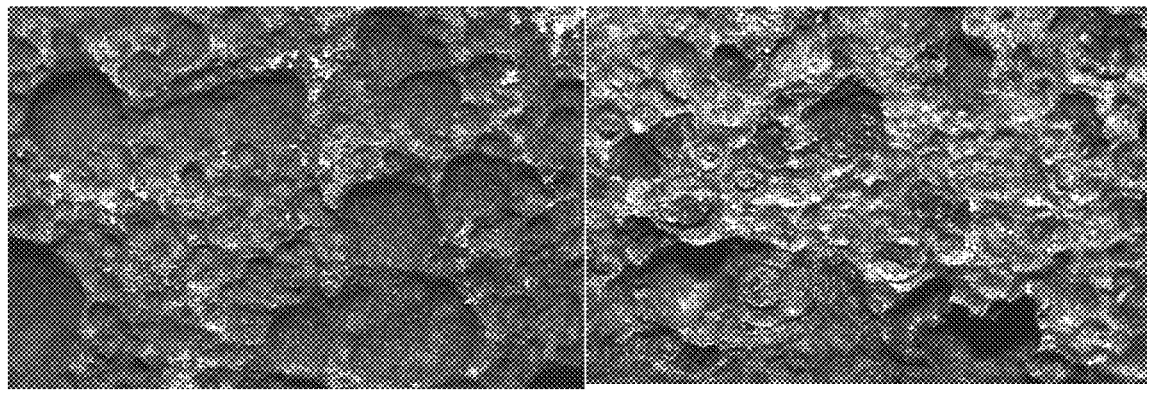
FIG. 4 contains a picture of the surface of 6 metal coupons (identified as A743, A934, B882, A953, A954, and A952) after exposure to acidic fluids as described in the description.
Figure 4:
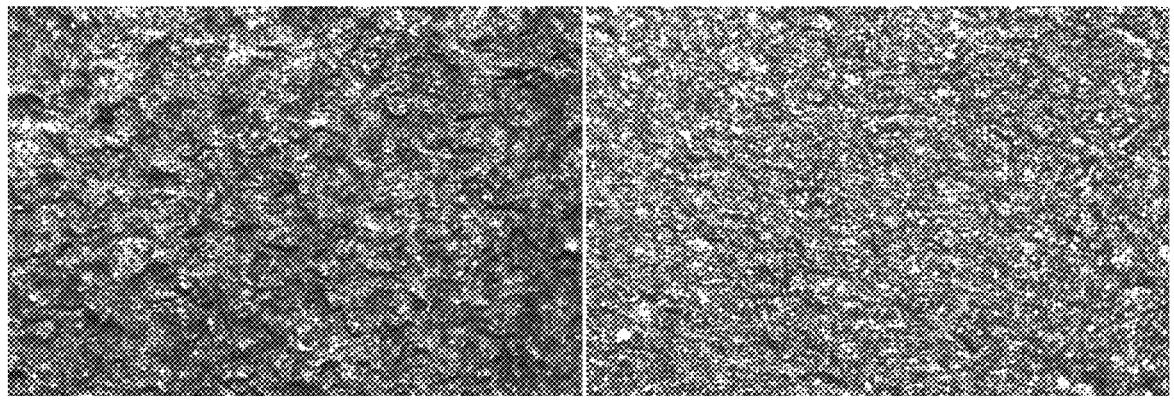
Figure 4:
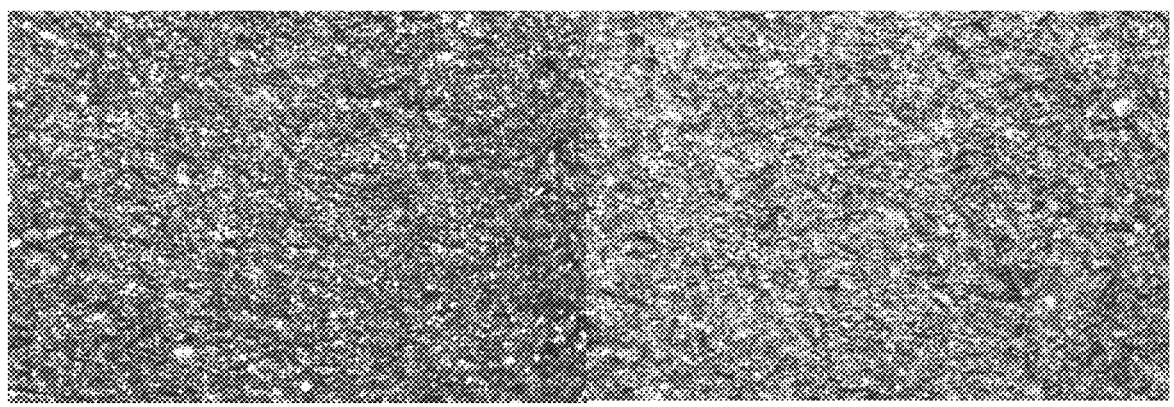
Figure 5:
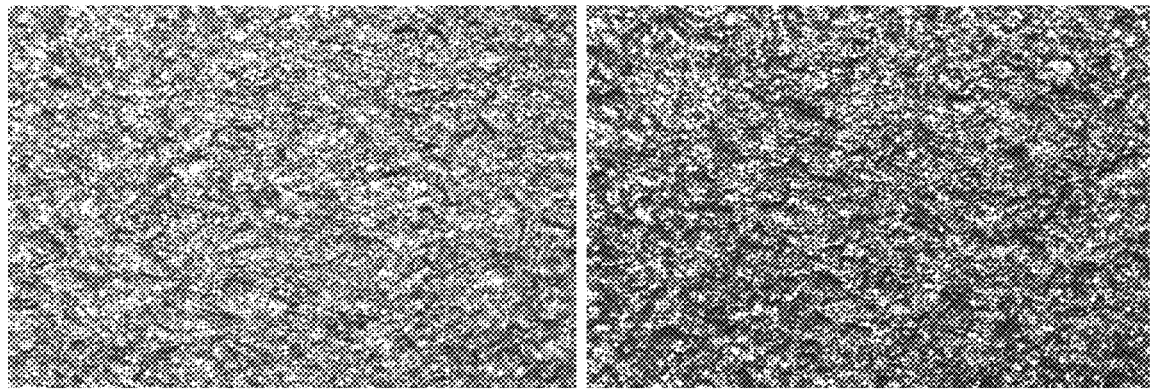
FIG. 5 contains a picture of the surface of 4 metal coupons (identified as A839, C045, A962 and A963) after exposure to acidic fluids as described in the description.
Figure 5:
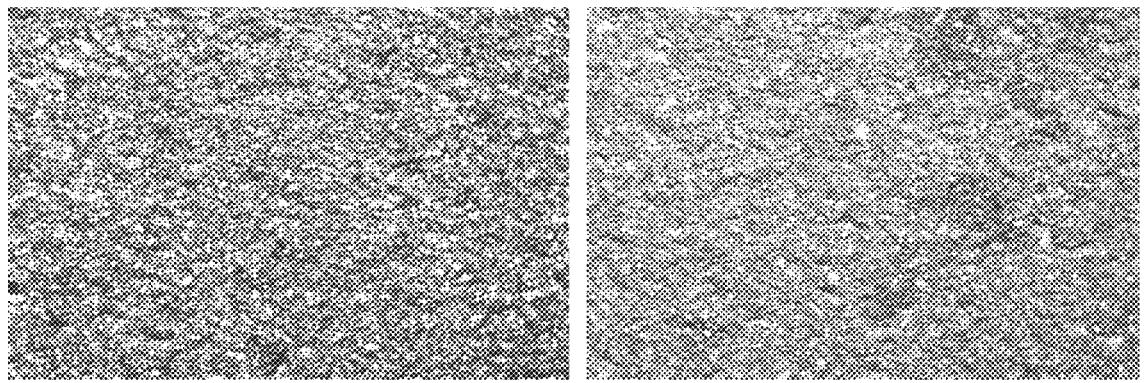

The description that follows, and the embodiments described therein, is provided by way of illustration of an example, or examples, of particular embodiments of the principles of the present invention. These examples are provided for the purposes of explanation, and not limitation, of those principles and of the invention.

According to an aspect of the invention, there is provided a corrosion inhibition package for use with an acidic composition, said corrosion inhibition package comprising:
a dialdehyde-containing hydrocarbon; and
at least one surfactant.

Preferably, the corrosion inhibition package further comprises
a propargyl alcohol or derivative thereof; and
a solvent.

Preferably, the dialdehyde-containing hydrocarbon is selected from the group consisting of: $C_1$-$C_{16}$ linear hydrocarbon comprising an aldehyde functional group at either extremity of the hydrocarbon. Preferably, the $C_1$-$C_{16}$ linear hydrocarbon comprising an aldehyde functional group at either extremity of the hydrocarbon is a $C_5$-$C_{12}$ linear hydrocarbon. Preferably also, the $C_5$-$C_{12}$ linear hydrocarbon comprising an aldehyde functional group at either extremity of the hydrocarbon is selected from the group consisting of: glutaraldehyde; succinaldehyde; malondialdehyde; adipaldehyde; heptanedial; nonanedial; undecanedial; and dodecanedial.

According to a preferred embodiment, the dialdehyde-containing hydrocarbon is selected from the group consisting of: saturated dialdehyde-containing hydrocarbons and $C_5$-$C_{16}$ branched hydrocarbon dialdehyde.

Alcohols and derivatives thereof, such as alkyne alcohols and derivatives and preferably propargyl alcohol and derivatives thereof can be used as corrosion inhibitors. Propargyl alcohol itself is traditionally used as a corrosion inhibitor which works well at low concentrations. It is however a very toxic/flammable chemical to handle as a concentrate, so care must be taken when exposed to the concentrate. In a composition according to the present invention, it is preferred to use 2-Propyn-1-ol, complexed with methyloxirane, as this is a much safer derivative to handle. Basocorr® PP is an example of such a compound. In preferred embodiments of the present invention, 2-Propyn-1-ol, complexed with methyloxirane is present in an amount ranging from 20% to 55% by volume of the total volume of the corrosion inhibition package.

According to a preferred embodiment of the present invention, the corrosion inhibition package comprises a surfactant which is environmentally friendly. More preferably, the surfactant is capable of withstanding exposure to temperatures of up to least 220° C. for a duration of 2 to 4 hours in a closed environment without undergoing degradation.

Preferably, the at least one amphoteric surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from $C_8$ to $C_{16}$. Most preferably, the amido betaine comprising a hydrophobic tail from $C_8$ to $C_{16}$ is cocamidobetaine.

Preferably also, the corrosion inhibition package further comprises an anionic surfactant. Preferably, the anionic surfactant is a carboxylic surfactant. More preferably, the carboxylic surfactant is a dicarboxylic surfactant. Even more preferably, the dicarboxylic surfactant comprises a hydrophobic tail ranging from $C_8$ to $C_{16}$. Most preferably, the dicarboxylic surfactant is sodium lauriminodipropionate Most preferred are embodiments of a corrosion inhibition package comprising cocamidopropyl betaine and β-Alanine, N-(2-carboxyethyl)-N-dodecyl-, sodium salt (1:1).

According to a preferred embodiment of the present invention, when preparing an acidic composition comprising a corrosion inhibition package, metal iodides or iodates such as potassium iodide, sodium iodide, cuprous iodide and lithium iodide can be added as corrosion inhibitor intensifier. The iodide or iodate is preferably present in a weight/volume percentage ranging from 0.1 to 1.5%, more preferably from 0.25 to 1.25%, yet even more preferably 1% by weight/volume of the acidic composition. Most preferably, the iodide used is potassium iodide.

Preferably, the solvent is selected from the group consisting of: methanol; ethanol; isopropanol; ethylene glycol; Di-n-hexyl-ether; and 2-Butoxyethanol; and combinations thereof.

Preferably, the organic compound comprising at least two aldehyde functional groups is present in an amount ranging from 2% to 25% by weight of the total weight of the corrosion inhibition package. Preferably also, the propargyl alcohol or derivative thereof is present in an amount ranging from 10% to 55% by volume of the total weight of the corrosion inhibition package. Preferably also, the at least one surfactant is present in an amount ranging from 2% to 20% by volume of the total weight of the corrosion inhibition package. Preferably also, the solvent is present in an amount ranging from 10% to 45% by volume of the total weight of the corrosion inhibition package.

Example 1—Formulation and Process to Prepare an Acidic Composition Comprising a Corrosion Inhibitor Package According to a Preferred Embodiment of the Invention Start by combining methanesulphonic acid (42 wt % of the composition) with water (58 wt % of the composition) and mix thoroughly for a few minutes. Add a pre-determined volume of the corrosion inhibitor package according to a preferred embodiment of the present invention described in Table 1 below. Add 0.1 wt % of potassium iodide to the composition. Circulation is maintained until all products have been solubilized. Table 1 lists the components of the corrosion inhibitors used with acid composition, including their weight percentage as compared to the total weight of the composition and the CAS numbers of each component.

TABLE 1

Composition of a corrosion inhibitor used in a composition according to a preferred embodiment of the present invention

| Component | | CI-D1 | CI-D2 |
|---|---|---|---|
| 2-Propyn-1-ol, compd. with methyloxirane | Vol % | 45 | 45 |
| .beta.-Alanine, N-(2-(carboxyethyl)-N-dodecyl-, sodium salt (1:1) | Vol % | 11.6 | 11.6 |
| Cocamidopropyl betaine | Vol % | 11.6 | 11.6 |
| Nonane-1,9-dial (NL) and 2-methyloctane-1,8-dial (MOL) | Vol % | 7 | 0 |
| Glutaric Dialdehyde | Vol % | 0 | 7 |
| Isopropanol | Vol % | 24.8 | 24.8 |
| Total | Vol % | 100 | 100 |

The chemical formula for Nonane-1,9-dial (NL) and 2-methyloctane-1,8-dial (MOL) are:

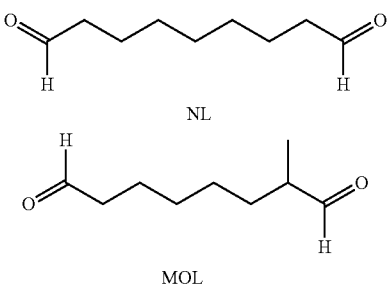

The chemical formula of glutaric dialdehyde is:

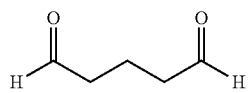

The resulting composition of Example 1 is a clear liquid having a strong odour and a shelf-life of greater than 1 year. It has a freezing point temperature of approximately minus 30° C. and a boiling point temperature of approximately 100° C. It has a specific gravity of 1.21±0.02. It is completely soluble in water and its pH is less than 1.

The composition is readily biodegradable, non-fuming and has no volatile organic compounds nor does it have any BTEX levels above the drinking water quality levels. BTEX refers to the chemicals benzene, toluene, ethylbenzene and xylene. Surrogate toxicity testing carried out on rats shows the LD50 to be not less than 1100 mg/kg.

Corrosion Testing

The compositions according to the present invention were exposed to corrosion testing. Various steel grades were exposed to various novel organic acid, modified acids and mineral acid compositions for periods of time ranging up to 6 hours at temperatures of up to 180° C.

The following corrosion testing outlined in Tables 2 to 11 (below) for acid compositions with known corrosion inhibition packages, for acid compositions with proprietary corrosion inhibition packages and for compositions according to the present invention at various temperatures for various durations of exposure. With respect to uniform corrosion, a desirable result was one where the lb/ft$^2$ corrosion number is at or below 0.05. More preferably, that number is at or below 0.02. Also desirable is the control of pitting corrosion as pitting weakens locally a metal, it is desirable to minimize or even completely eliminate pitting. Where coupons are identified, FIGS. 2, 3, 4 and 5 provide a photograph of the surface of the coupon post-corrosion testing. Pitting was noted in some coupons after exposure.

The predominant cause of corrosion of metals by MSA is known to be pitting corrosion, the below testing allows to determine the effectiveness of the corrosion inhibition packages against this very serious type of corrosion. FIG. 1 provides a schematic view of various types of pitting corrosion and methods of identifying each groups of pitting corrosion. In a first case, the pitting corrosion can be identified by simple visual inspection. In a second case, the pitting corrosion can be identified with the use of special inspection tools. And in a third case, the pitting corrosion can be identified by microscopic examination.

TABLE 2

Corrosion testing performed at 150° C. with MSA (21%) for a duration of 6 hours where the steel density is 7.86 g/cc

| Steel type | | Corrosion inhibitor | Loss (g) | Surface area (cm$^2$) | Mils/yr | Mm/year | Lb/ft2 |
|---|---|---|---|---|---|---|---|
| J55 | B900 | 2.0% CI-5, 1.5% CI-1A | 0.1046 | 28.992 | 263.8452 | 6.7017 | 0.007 |
| N80 | A745 | 2.0% CI-5, 1.5% CI-1A | 0.1997 | 28.0774 | 520.136 | 13.2115 | 0.015 |
| L80 | A929 | 2.0% CI-5, 1.5% CI-1A | 0.1897 | 28.0774 | 494.0901 | 12.5499 | 0.014 |

CI-1A is a 10% potassium iodide solution. Thus, the total KI present is 0.15%

CI-5 refers to a proprietary corrosion inhibitor package comprising a terpene; a cinnamaldehyde or a derivative thereof; at least one amphoteric surfactant; and a solvent.

TABLE 3

Corrosion testing performed at 150° C. with
MSA (21%) where the steel density is 7.86 g/cc

| Steel type | | Corrosion inhibitor | Loss (g) | Surface area (cm$^2$) | Duration of exposure (hr) | Mils/yr | Mm/year | Lb/ft2 |
|---|---|---|---|---|---|---|---|---|
| N80 | A744 | 2.0% CI-2, 1.5% CI-1A | 2.1114 | 28.0774 | 4 | 8248.987 | 209.5243 | 0.154 |
| L80 | A933 | 2.0% CI-2, 1.5% CI-1A | 2.7938 | 28.0774 | 6 | 7276.695 | 184.8280 | 0.204 |
| J55 | B883 | 2.0% CI-2, 1.5% CI-1A | 0.8099 | 28.992 | 6 | 2042.909 | 51.8899 | 0.057 |

CI-1A is a 10% potassium iodide solution.
CI-2 refers to a commercially available corrosion inhibitor package.

TABLE 4

Corrosion testing performed at 180° C. with MSA (21%) where the steel density is 7.86 g/cc

| Steel type | | Corrosion inhibitor | Loss (g) | Surface area (cm$^2$) | Duration of exposure (hr) | Mils/yr | Mm/year | Lb/ft2 |
|---|---|---|---|---|---|---|---|---|
| J55 | B889 | 3.0% CI-5 2.5% CI-1A 0.2% NE-1 | 0.1291 | 28.992 | 4 | 488.4668 | 12.4071 | 0.009 |
| J55 | B890 | 3.0% CI-5 2.5% CI-1A 0.2% NE-1 | 0.4215 | 28.992 | 6 | 1063.2 | 27.0053 | 0.030 |
| N80 | A829 | 2.25% CI-5 2.0% CI-1A 0.2% NE-1 | 0.2113 | 28.0774 | 4 | 825.5238 | 20.9683 | 0.015 |
| N80 | A827 | 3.0% CI-5 2.5% CI-1A 0.2% NE-1 | 0.4842 | 28.0774 | 6 | 1261.141 | 32.0330 | 0.035 |
| L80 | A910 | 3.0% CI-5 2.5% CI-1A 0.2% NE-1 | 0.1661 | 28.0774 | 4 | 648.9328 | 16.4829 | 0.012 |
| L80 | A911 | 2.25% CI-5 2.0% CI-1A 0.2% NE-1 | 0.2693 | 28.0774 | 4 | 1052.123 | 26.7239 | 0.020 |

CI-1A refers to a 10% solution of potassium iodide;
CI-5 refers to a proprietary corrosion inhibitor package comprising a terpene; a cinnamaldehyde or a derivative thereof; at least one amphoteric surfactant; and a solvent.
NE-1 is a non-emulsifier.

TABLE 5

Corrosion testing performed at 180° C. with MSA (21%) where
the steel density is 7.86 g/cc for a duration of exposure of 4 hours

| Steel | Coupon | Corrosion | Loss | Surface | Mils/yr | Mm/year | Lb/ft2 |
|---|---|---|---|---|---|---|---|
| N80 | A743 | 2.25% CI-2, | 3.652 | 28.0774 | 14267.93 | 362.4053 | 0.267 |
| L80 | A934 | 2.25% CI-2 | 1.3818 | 28.0774 | 5398.527 | 137.1226 | 0.101 |
| J55 | B882 | 2.25% CI-2 | 0.3347 | 28.992 | 1266.381 | 32.1661 | 0.024 |

CI-1A is a 10% potassium iodide solution.

TABLE 6

Corrosion testing performed at 150° C. with MSA (21%) where on L80 steel coupons where the steel density is 7.86 g/cc (coupon surface area 28.0774 cm$^2$)

| Corrosion inhibitor | Coupon # | Loss (g) | Duration of Exposure (hours) | Mils/yr | Mm/year | Lb/ft2 |
|---|---|---|---|---|---|---|
| 2.0% CI-DA1, 1.5% CI-1A | A953 | 0.0612 | 4 | 239.1010683 | 6.0732 | 0.004 |
| 2.0% CI-DA1, 1.5% CI-1A | A954 | 0.1155 | 6 | 300.8297755 | 7.6411 | 0.008 |

CI-1A is a 10% potassium iodide solution.

TABLE 7

Corrosion testing performed at 180° C. with MSA (21%) where the steel density is 7.86 g/cc for a duration of exposure of 4 hours

| Steel type | Coupon # | Corrosion inhibitor | Weight loss (g) | Surface area (cm$^2$) | Mils/yr | Mm/year | Lb/ft2 |
|---|---|---|---|---|---|---|---|
| L80 | A952 | 2.25% CI-DA1, 2.0% CI-1A | 0.1379 | 28.0774 | 538.7587798 | 13.6845 | 0.010 |
| N80 | A839 | 2.25% CI-DA1, 2.0% CI-1A | 0.1483 | 28.0774 | 579.3903339 | 14.7165 | 0.011 |
| J55 | C045 | 2.25% CI-DA1, 2.0% CI-1A | 0.1493 | 28.992 | 564.8961506 | 14.3484 | 0.011 |

CI-1A is a 10% potassium iodide solution.

TABLE 8

Corrosion testing performed at 150° C. with MSA (21%) where on L80 steel coupons where the steel density is 7.86 g/cc (coupon surface area 28.0774 cm$^2$)

| Coupon # | Corrosion inhibitor | Weight loss (g) | Exposure time | Mils/yr | Mm/year | Lb/ft2 |
|---|---|---|---|---|---|---|
| A962 | 2.0% CI-DA2, 1.5%CI-1A | 0.2033 | 4 | 794.268745 | 20.1744 | 0.015 |
| A963 | 2.0% CI-DA2, 1.5%CI-1A | 0.169 | 6 | 440.1751694 | 11.1804 | 0.012 |

CI-1A is a 10% potassium iodide solution.

TABLE 9

Corrosion testing performed at 180° C. with MSA (21%) where the steel density is 7.86 g/cc for a duration of exposure of 4 hours

| Steel type | Corrosion inhibitor | Loss (g) | Surface area (cm$^2$) | Mils/yr | Mm/year | Lb/ft2 |
|---|---|---|---|---|---|---|
| L80 | 2.25% CI-DA2, 2.0% CI-1A | 0.2058 | 28.0774 | 804.0359455 | 20.4225 | 0.015 |
| N80 | 2.25% CI-DA2, 2.0% CI-1A | 0.152 | 28.0774 | 593.8457906 | 15.0837 | 0.011 |
| J55 | 2.25% CI-DA2, 2.0% CI-1A | 0.1871 | 28.992 | 707.9174131 | 17.9811 | 0.013 |

CI-1A is a 10% potassium iodide solution.

TABLE 10

Corrosion testing performed at 150° C. on L80 steel coupons at 400 psi pressure, with a coupon surface area of 31.806 cm² and a density of 7.86 g/cm³

| Acid Blend | Dilution (%) | Time (Hrs) | CI Package | Wt. Loss (g) | mils/year | mm/year | lb/ft² |
|---|---|---|---|---|---|---|---|
| MSA composition of Example 1 | 50% | 6 | 2.0% CI-DA1, 1.5% CI-1A | 0.1444 | 332.008 | 8.433 | 0.009 |
| MSA composition of Example 1 | 50% | 6 | 2.0% CI-DA2, 1.5% CI-1A | 0.2910 | 669.074 | 16.994 | 0.019 |
| Lys-HCl* | 50% | 4 | 6.0% CI-DA1, 4.5% CI-1A | 0.2907 | 1002.577 | 25.465 | 0.019 |
| Lys-HCl* | 50% | 4 | 6.0% CI-DA2, 4.5% CI-1A | 0.3879 | 1337.804 | 33.980 | 0.025 |
| HCl | 7.5% | 6 | 6.0% CI-DA1, 4.5% CI-1A | 0.6746 | 1551.057 | 39.397 | 0.043 |
| HCl | 7.5% | 6 | 6.0% CI-DA2, 4.5% CI-1A | 0.5174 | 1189.619 | 30.216 | 0.033 |
| MEA-HCl** | 50% | 4 | 6.0% CI-DA1, 4.5% CI-1A | 0.1809 | 623.895 | 15.847 | 0.012 |
| MEA-HCl** | 50% | 4 | 6.0% CI-DA2, 4.5% CI-1A | 0.1940 | 669.074 | 16.994 | 0.012 |
| HCl | 7.5% | 4 | 6.0% CI-DA1, 4.5% CI-1A | 0.2212 | 762.883 | 19.377 | 0.014 |
| HCl | 7.5% | 4 | 6.0% CI-DA2, 4.5% CI-1A | 0.1075 | 370.750 | 9.417 | 0.007 |

CI-1A is a 10% potassium iodide solution.
*A modified acid composition as used in the testing reported above comprises lysine:HCl composition in a ratio of 1:4.5. This composition is obtained through the following mixing ratio: 370 ml of L50 solution + 300 ml 22Baume HCl; which leads to the following ratio: 1 mol Lysine monohydrochloride to 4.5 mol HCl. The L50 solution is a 1:2.1 molar ratio of lysine to HCl.
**Monoethanolamine (MEA) and hydrochloric acid are used as starting reagents. To obtain a 1:4.1 molar ratio of MEA to HCl, one must first mix 165 g of MEA with 835 g of water. This forms the monoethanolamine solution. Subsequently, one takes 370 ml of the monoethanolamine solution and mixes with 350 ml of HCl aq. 36% (22 Baume).

TABLE 11

Corrosion testing performed with TSA (30%) at 150° C. on L80 steel coupons at 400 psi pressure, with a coupon surface area of 31.806 cm² and a density of 7.86 g/cm³

| Acid Blend | Time (hrs) | CI Package | Wt. Loss (g) | mils/year | mm/year | lb/ft² |
|---|---|---|---|---|---|---|
| p-TSA (30%) | 6 | 2.0% CI-DA1, 1.5% CI-1A | 0.2373 | 545.606 | 13.858 | 0.015 |
| p-TSA (30%) | 6 | 2.0% CI-DA2, 1.5% CI-1A | 0.4569 | 1050.516 | 26.683 | 0.029 |
| p-TSA (30%) | 4 | 2.0% CI-DA1, 1.5% CI-1A | 0.1757 | 605.961 | 15.391 | 0.011 |
| p-TSA (30%) | 4 | 2.0% CI-DA2, 1.5% CI-1A | 0.2245 | 774.264 | 19.666 | 0.014 |
| p-TSA (30%) | 6 | 2.0% CI-5, 1.5% CI-1A | 0.2448 | 562.850 | 14.296 | 0.016 |

With respect to the corrosion impact of the composition on typical oilfield grade steel, it was established that it was clearly well below the acceptable corrosion limits set by industry for certain applications, such as spearhead applications or downhole scaling. Moreover, it was noted upon visual inspection that the commercially available corrosion inhibitor package did not perform well in the prevention of pitting corrosion (see coupons A744, A933, B883) at temperature of 150° C. and, as expected, was even worse at 180° C. (see coupons A743, A934 and B882) which exhibited very large pits. The proprietary corrosion inhibition package (CI-5) performed well at 150° C. where coupons had few or no pits (see coupons B900, A745 and A929). Where pits were present, these were quite small. At 180° C., pits were more evident (see coupons B889, B890, A829, A827, A910 and A911). Overall, the pits were small but present. Two of the tested corrosion inhibition package according to preferred embodiments of the present invention (CI-DA1 and CI-DA2) showed no visible signs of pitting at 150° C. (see coupons A953, A954, A962 and A963). At 180° C., no pits were seen on coupons A952 and A839 while very minimal and light pitting was observed on coupon C045. Visual analysis of the coupons confirms that the compositions according to a preferred embodiment of the present invention were superior when considering the pitting corrosion predominant in the use of alkanesulfonic acids such as MSA.

Overall, the corrosion rates using a composition according to preferred embodiments of the present invention obtained were up to 3 times less compared to composition using a similar corrosion inhibitor but with an aldehyde containing compound in place of an organic compound comprising at least two aldehyde functional groups. The difference being that CI-DA1 and CI-DA2 comprise a saturated dialdehyde instead of a monoaldehyde. It is hypothesized that the aldehyde reacts with the protonated tertiary amine group in sodium lauriminodipropionate. It appears the organic compound comprising at least two aldehyde functional groups reacts with sodium lauriminodipropionate and forms an aggregate with the ionic groups available and, therefore, is a much more effective film former.

Moreover, preferred corrosion inhibitors according to the present invention have shown applicability with various types of acids (organic acids, mineral acids, and modified acids).

Acidic compositions using the corrosion inhibitor compositions according to the present invention can be used in the following and non-limiting examples: injection/disposal in wells; squeezes and soaks or bullheads; acid fracturing, acid washes or matrix stimulations; fracturing spearheads (breakdowns); pipeline scale treatments; cement breakdowns or perforation cleaning; pH control; and de-scaling applications.

Additionally, corrosion inhibition packages according to preferred embodiments of the present invention will allow the end user to utilize synthetic and modified acids that have the down-hole performance advantages, transportation and storage advantages as well as the health, safety and environmental advantages. The person skilled in the art will also understand that the corrosion package according to the present invention is useful when as also utilized with conventional acid systems.

In addition to stability at high temperatures and desirable corrosion rates as discussed above, the use of synthetic and modified acids along with a corrosion package according to a preferred embodiment of the present invention, allows for reduction in skin corrosiveness, a more controlled or methodical spending or reacting property, minimizing near well bore damage typically caused by an ultra-aggressive reaction with the formation typically caused by HCl and increasing formation penetration providing superior production over time.

Uses of Corrosion Inhibition Packages According to Preferred Embodiments of the Present Invention The uses (or applications) of the corrosion inhibition packages according to the present invention when combined (or mixed) with acidic compositions upon dilution of the latter ranging from approximately 1 to 90% dilution, include, but are not limited to: injection/disposal well treatments; matrix acid squeezes, soaks or bullheads; acid fracturing, acid washes; fracturing spearheads (breakdowns); pipeline scale treatments, cement breakdowns or perforation cleaning; pH control; and de-scaling applications. As would be understood by the person skilled in the art, the methods of use generally comprise the following steps: providing a composition comprising a corrosion inhibitor package according to a preferred embodiment of the present; mixing said package with an acid composition; exposing a surface (such as a metal surface) to the acid composition comprising the package; allowing the acid composition a sufficient period of time to act upon said surface; and optionally, removing the acid composition when the exposure time has been determined to be sufficient for the operation to be complete or sufficiently complete. Another method of use comprises: injecting the acid composition comprising the package into a well and allowing sufficient time for the acid composition to perform its desired function. Yet another method of use comprises: exposing the acid composition comprising the package to a body of fluid (typically water) requiring a decrease in the pH and allowing sufficient exposure time for the acid composition to lower the pH to the desired level.

One of the advantages of the use of a synthetic acid composition using a corrosion inhibition package according to a preferred embodiment of the present invention includes: the reduction of the total loads of acid, and the required number of tanks by delivering concentrated product to location and diluting with fluids available on location (with low to high salinity production water).

An acidic composition comprising a corrosion inhibition package according to a preferred embodiment of the present invention can be used to treat scale formation inside a ultra-high SAGD (steam assisted gravity drainage) well wherein the SAGD or cyclical steam operation is halted and said synthetic or modified acid is injected into said well to treat scale formation inside said well, wherein the treatment does not require a cool-down period between stopping the steam and the injection of the synthetic or modified acid composition.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A corrosion inhibition package for use with an aqueous acid composition, said corrosion inhibition package consisting of:
   a dialdehyde-containing hydrocarbon component selected from the group consisting of: glutaraldehyde; succinaldehyde; malondialdehyde; adipaldehyde; heptanedial; nonanedial; undecanedial; 2,9-diethyldecanedial; and dodecanedial;
   a solvent selected from the group consisting of: isopropanol; methanol; ethanol; 2-butoxyethanol; diethylene glycol; di-n-hexyl-ether; and combinations thereof;
   an amphoteric surfactant selected from the group consisting of: a sultaine surfactant; a betaine surfactant; and combinations thereof,
   an anionic surfactant; and a propargyl alcohol.

2. The corrosion inhibition package as claimed in claim 1, wherein the sultaine surfactant is an amino sultaine surfactant, the betaine surfactant is an amino betaine surfactant, or a combination thereof.

3. The corrosion inhibition package as claimed in claim 1, wherein the betaine surfactant is an amido betaine surfactant comprising a hydrophobic tail from $C_8$ to $C_{16}$.

4. The corrosion inhibition package as claimed in claim 1, wherein the betaine surfactant is cocamidobetaine.

5. The corrosion inhibition package as claimed in claim 1, wherein the anionic surfactant is a carboxylic surfactant.

6. The corrosion inhibition package as claimed in claim 1, wherein the anionic surfactant is an iminodicarboxylate.

7. The corrosion inhibition package as claimed in claim 1, wherein the anionic surfactant is sodium lauriminodipropionate.

8. The corrosion inhibition package as claimed in claim 1, wherein the betaine surfactant is cocamidopropyl betaine, the anionic surfactant is β alanine, N-(2-carboxyethyl)-N-dodecyl-, sodium salt (1:1), or a combination thereof.

9. The corrosion inhibition package as claimed in claim 1, wherein the dialdehyde-containing hydrocarbon is present in an amount ranging from 2% to 25% by volume of the total volume of the corrosion inhibition package.

10. The corrosion inhibition package as claimed in claim 1, wherein the amphoteric surfactant and the anionic surfactant are present in a total amount ranging from 2% to 20% by volume of the total volume of the corrosion inhibition package.

11. An aqueous liquid acidic composition consisting of:
an acidic solution; and
a corrosion package consisting of:
    a dialdehyde-containing hydrocarbon component selected from the group consisting of: glutaraldehyde; succinaldehyde; malondialdehyde; adipaldehyde; heptanedial; nonanedial; undecanedial; and dodecanedial;
    a solvent selected from the group consisting of: isopropanol; methanol; ethanol; 2-butoxyethanol; diethylene glycol; di-n-hexyl-ether; and combinations thereof;
    an amphoteric surfactant is selected from the group consisting of: a sultaine surfactant; a betaine surfactant; and combinations thereof;
    an anionic surfactant; and
    a propargyl alcohol;
wherein the volume % of the corrosion package in the acidic composition ranges from 0.1 to 10%.

12. The composition according to claim 11, wherein said acidic solution comprises an acid selected from the group consisting of: mineral acids; organic acids, synthetic acids; modified acids; complexed acids and combinations thereof.

13. The composition according to claim 11, wherein the acidic solution comprises an acid selected from the group consisting of: HCl; amino acid-HCl; urea-HCl; alkanolamine-HCl; hydrofluoric acid; sulfuric acid; toluenesulfonic acid; methanesulfonic acid; and phosphoric acid.

14. The composition according to claim 13, wherein the amino acid-HCl is lysine-HCl.

15. The composition according to claim 13, wherein the alkanolamine-HCl is MEA-HCl.

16. A method of minimizing pitting corrosion at temperatures above 130° C., wherein said method comprises:
providing an acidic fluid;
providing a composition consisting of:
    a dialdehyde-containing hydrocarbon component selected from the group consisting of: glutaraldehyde; succinaldehyde; malondialdehyde; adipaldehyde; heptanedial; nonanedial; undecanedial; and dodecanedial,
    a solvent selected from the group consisting of: isopropanol; methanol; ethanol; 2-butoxyethanol; diethylene glycol; di-n-hexyl-ether, and combinations thereof;
    an amphoteric surfactant is selected from the group consisting of: a sultaine surfactant; a betaine surfactant; and combinations thereof, and
    an anionic surfactant;
combining said acidic fluid with said composition to obtain a mixed fluid;
exposing said mixed fluid to a metallic surface at a temperature of at least 130° C.; and
allowing said mixed fluid sufficient time of exposure to the metallic surface of a metal to minimize the pitting corrosion.

* * * * *